US010723319B2

(12) United States Patent
Okamoto

(10) Patent No.: US 10,723,319 B2
(45) Date of Patent: Jul. 28, 2020

(54) WIPER DEVICE

(71) Applicant: DENSO CORPORATION, Kariya-shi, Aichi-ken (JP)

(72) Inventor: Keisuke Okamoto, Kariya (JP)

(73) Assignee: DENSO CORPORATION, Kariya-shi, Aichi-ken (JP)

(*) Notice: Subject to any disclaimer, the term of this patent is extended or adjusted under 35 U.S.C. 154(b) by 12 days.

(21) Appl. No.: 16/098,413

(22) PCT Filed: Jun. 2, 2017

(86) PCT No.: PCT/JP2017/020571
§ 371 (c)(1),
(2) Date: Nov. 1, 2018

(87) PCT Pub. No.: WO2017/213037
PCT Pub. Date: Dec. 14, 2017

(65) Prior Publication Data
US 2019/0118774 A1 Apr. 25, 2019

(30) Foreign Application Priority Data
Jun. 6, 2016 (JP) ................. 2016-112770

(51) Int. Cl.
B60S 1/04 (2006.01)
B60S 1/34 (2006.01)
(Continued)

(52) U.S. Cl.
CPC ............. B60S 1/0491 (2013.01); B60S 1/349 (2013.01); B60S 1/3479 (2013.01);
(Continued)

(58) Field of Classification Search
CPC .......... B60S 1/48; B60S 1/0433; B60S 1/349; B60S 1/3493; B60S 1/0491; B60S 1/3479;
(Continued)

(56) References Cited

U.S. PATENT DOCUMENTS 7,222,386 B2 5/2007 Nakamura

FOREIGN PATENT DOCUMENTS

EP 1083101 A2 * 3/2001
JP 2004082756 A 3/2004
(Continued)

OTHER PUBLICATIONS

International Search Report for PCT/JP2017/020571 dated Aug. 29, 2017, all pages.
(Continued)

Primary Examiner — Gary K. Graham
(74) Attorney, Agent, or Firm — Kilpatrick Townsend & Stockton LLP

(57) ABSTRACT

A wiper device includes a pivot shaft, a pivot holder, a water receiving cap and a washer. The pivot holder includes a pivot support portion and a mounting leg. The pivot support portion pivotally supports the pivot shaft. The water receiving cap includes a boss portion and an umbrella portion. The boss portion is fitted onto the pivot support portion. The washer is fixed to a circumference of the pivot shaft at a portion projecting from a distal end of the pivot support portion. At least part of the boss portion overlaps the washer in an axial direction. The umbrella portion includes a projection that projects in the axial direction. The projection opposes the mounting leg in a circumferential direction without engaging the mounting leg in the axial direction.

9 Claims, 5 Drawing Sheets

(51) Int. Cl.
   *H02K 5/10* (2006.01)
   *F16C 11/04* (2006.01)
   *B60S 1/24* (2006.01)
   *B60R 13/07* (2006.01)

(52) U.S. Cl.
   CPC ............. *B60S 1/3481* (2013.01); *B60R 13/07* (2013.01); *B60S 1/0425* (2013.01); *B60S 1/24* (2013.01); *B60S 1/245* (2013.01); *B60S 1/3443* (2013.01); *B60S 1/3488* (2013.01); *B60S 1/3493* (2013.01); *F16C 11/04* (2013.01); *F16C 2326/09* (2013.01); *H02K 5/10* (2013.01)

(58) Field of Classification Search
   CPC ...... B60S 1/3443; B60S 1/0425; B60R 13/07; F16C 2326/09
   See application file for complete search history.

(56) References Cited

FOREIGN PATENT DOCUMENTS

| | | | |
|---|---|---|---|
| JP | 2005-170245 A | | 6/2005 |
| JP | 2005-324710 | * | 11/2005 |

OTHER PUBLICATIONS

International Preliminary Report on Patentability for PCT/JP2017/020571 dated Dec. 11, 2018, all pages.

\* cited by examiner

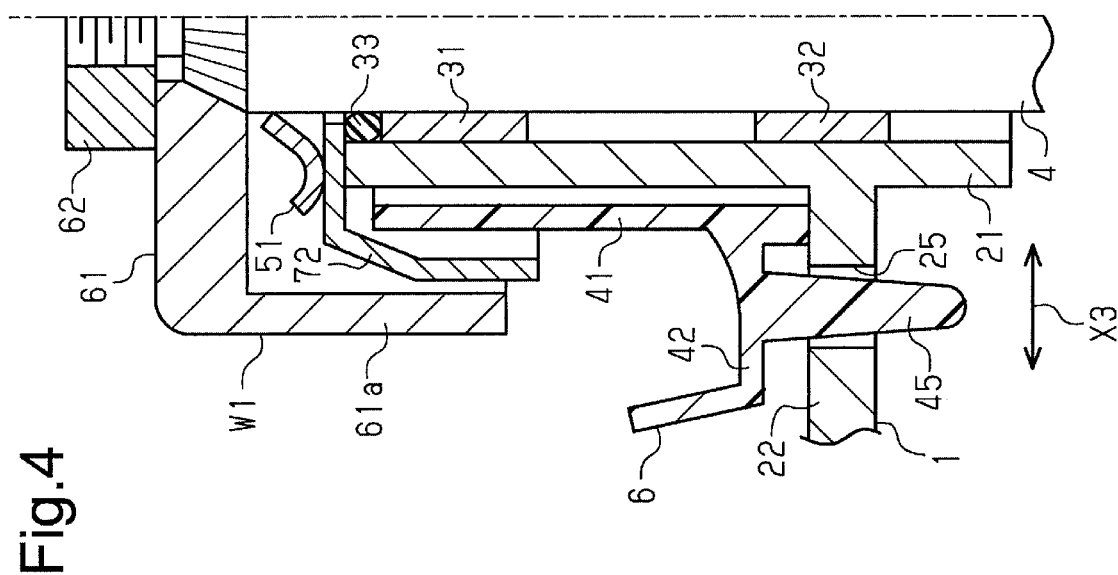
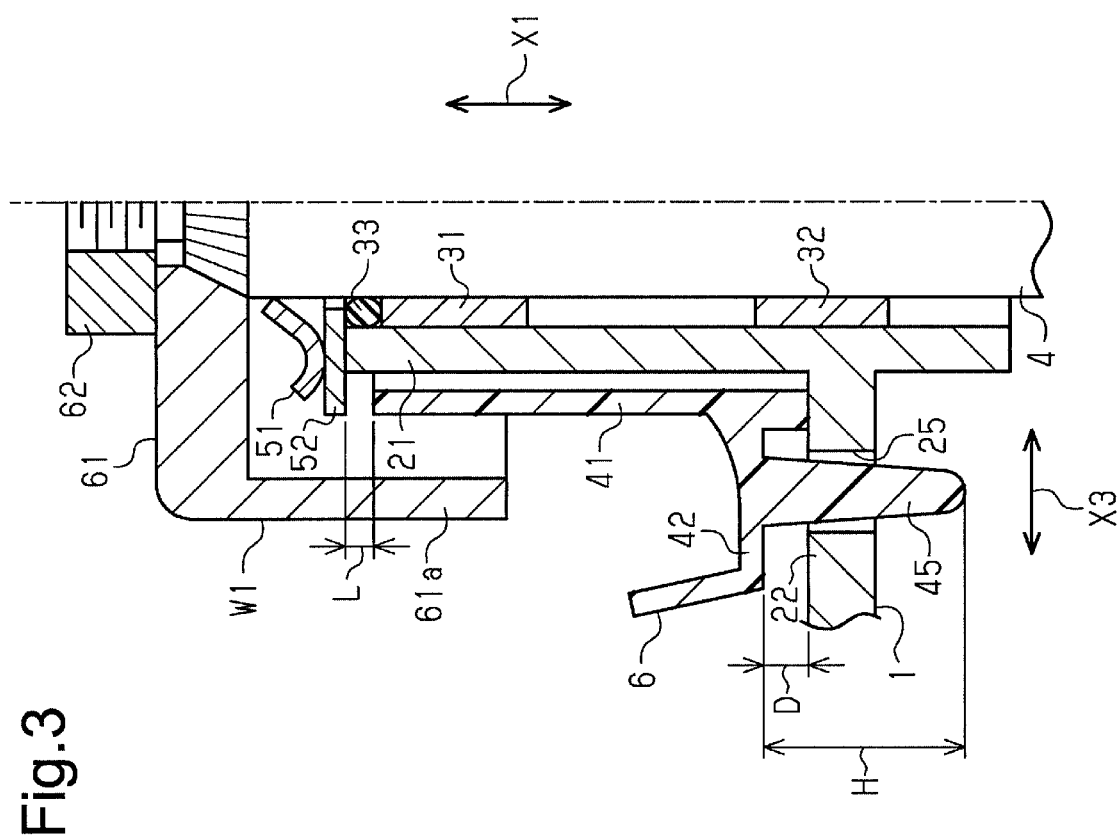

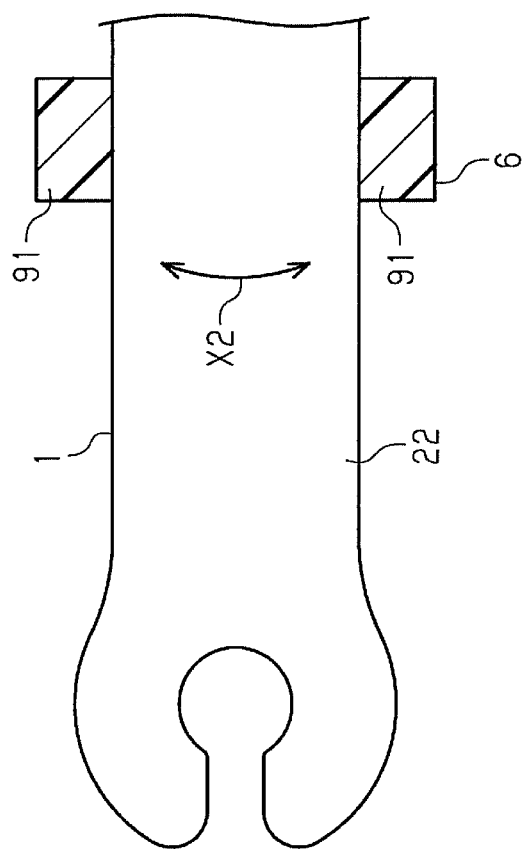
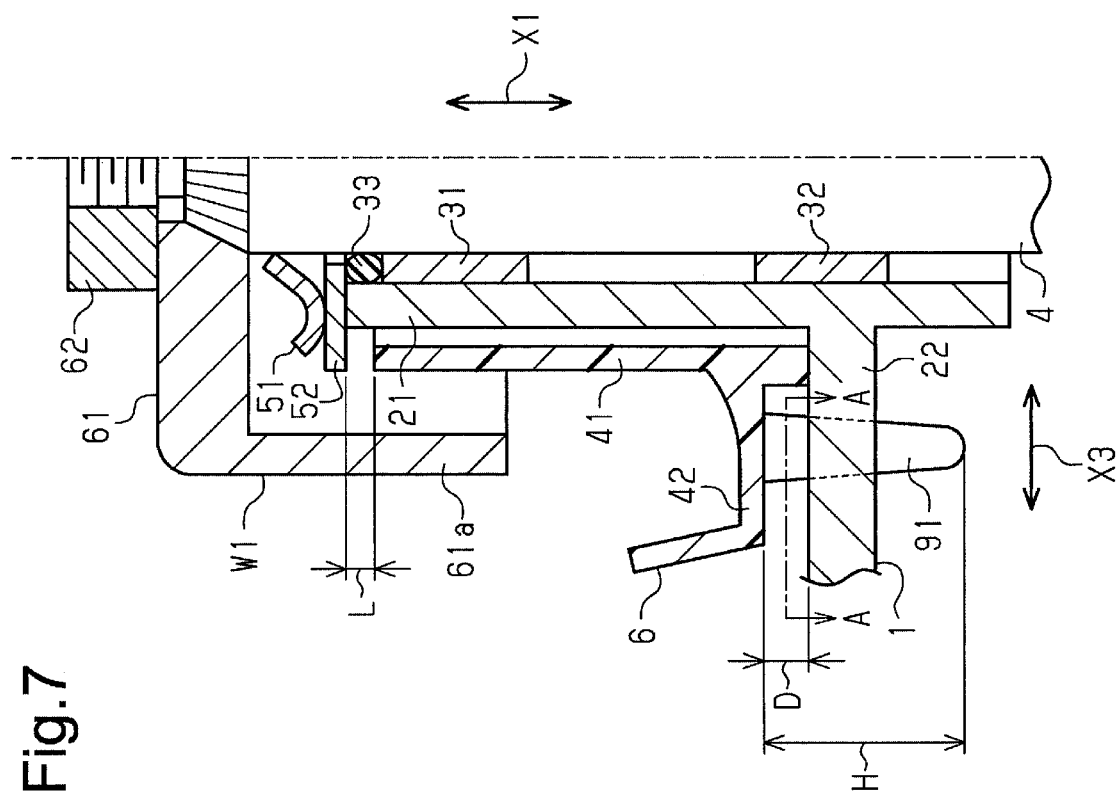

ained to each other.
WIPER DEVICE

TECHNICAL FIELD

The present invention relates to a wiper device.

BACKGROUND ART

A conventional wiper device that wipes a window glass of a vehicle includes a pivot shaft coupled to a wiper arm, and a pivot holder, pivotally supporting the pivot shaft. In such a wiper device, the pivot shaft is arranged in a state in which the pivot shaft is inserted through a pivot hole, which is formed in a panel body (cowl top panel) of a vehicle body.

In this case, liquid such as rain water and car wash water may enter the vehicle body through the pivot hole and collect on a motor or coupling parts of a linkage mechanism (for example, ball joint) that allows for pivoting of the pivot shaft. This may cause electric problems or eliminate grease. Accordingly, the pivot holder includes a water receiving cap that receives the liquid entering the vehicle body through the pivot hole and drains the liquid at a location separated from the motor and the coupling parts of the linkage mechanism.

For example, in the wiper device described in patent document 1, the water receiving cap, which is made of a resin, includes a tubular portion fitted onto the pivot holder from the distal side of the pivot holder. A projection projects radially inward from the inner circumferential surface of the tubular portion. The projection is engaged with an engagement groove arranged in the outer circumferential surface at the proximal end of the pivot holder to couple the water receiving cap to the pivot holder. The projection, which is engaged with the engagement groove, restricts movement of the water receiving cap toward the distal side of the pivot holder as well as rotation of the water receiving cap in the circumferential direction relative to the pivot holder. Further, the water receiving cap includes an umbrella portion that receives liquid such as water or the like entering the vehicle body through the pivot hole. The umbrella portion drains the liquid through a drainage pipe, which is arranged in the umbrella portion.

PRIOR ART DOCUMENT

Patent Document

Patent Document 1: Japanese Patent No. 3934509

SUMMARY OF THE INVENTION

Problems that are to be Solved by the Invention

However, in the wiper device described in patent document 1, when the tubular portion of the water receiving cap is fitted onto the pivot holder, the projection, which is located at the lower part of the tubular portion, is rubbed against the outer circumferential surface of the pivot holder from the distal end of the pivot holder to the engagement groove until the projection engages the engagement groove. The friction produced between the projection and the pivot holder may scrape the projection. Generally, the pivot holder is often made of a metal, and the projection that is made of a resin thus has a tendency to be scraped. Scraping of the resin projection decreases the force engaging the projection with the engagement groove and causes the projection to be easily disengaged from the engagement groove. Thus, the water receiving cap may be separated from the pivot holder by vibration or the like during transportation. Further, the water receiving cap may be rotated in the circumferential direction relative to the pivot holder.

One object of the present invention is to provide a wiper device that ensures prevention of separation of the water receiving cap from the pivot holder when the water receiving cap and the pivot holder are correctly coupled to each other.

Means for Solving the Problem

A wiper device that achieves the above object in accordance with one mode includes a pivot shaft, to which a wiper is coupled, a pivot holder, a water receiving cap, and at least one washer. The pivot holder includes a tubular pivot support portion and a mounting leg. The pivot support portion pivotally supports the pivot shaft that is inserted into the pivot support portion. The mounting leg projects radially outward from an outer circumferential surface of the pivot support portion. The water receiving cap includes a tubular boss portion and an umbrella portion. The boss portion is fitted onto the pivot support portion. The umbrella portion extends radially outward from the boss portion. The at least one washer is fixed to a circumference of the pivot shaft at a portion projecting from a distal end of the pivot support portion. At least part of the boss portion overlaps the washer in an axial direction of the pivot shaft. The umbrella portion includes a projection that projects in the axial direction of the pivot shaft. The projection opposes the mounting leg in a circumferential direction of the pivot shaft without engaging the mounting leg in the axial direction of the pivot shaft in a state in which the water receiving cap is coupled to the pivot holder.

BRIEF DESCRIPTION OF THE DRAWINGS

FIG. 3 is a cross-sectional view of the portion around the first pivot shaft in the wiper device of FIG. 2.

FIG. 4 is a cross-sectional view of the portion around the first pivot shaft in a wiper device according to another embodiment.

FIG. 7 is a cross-sectional view of the portion around the first pivot shaft in a wiper device according to a further embodiment.

FIG. 8 is a cross-sectional view taken along line A-A in FIG. 7 showing the wiper device according to the further embodiment.

EMBODIMENTS OF THE INVENTION

A wiper device according to one embodiment will now be described.

Figure 1:
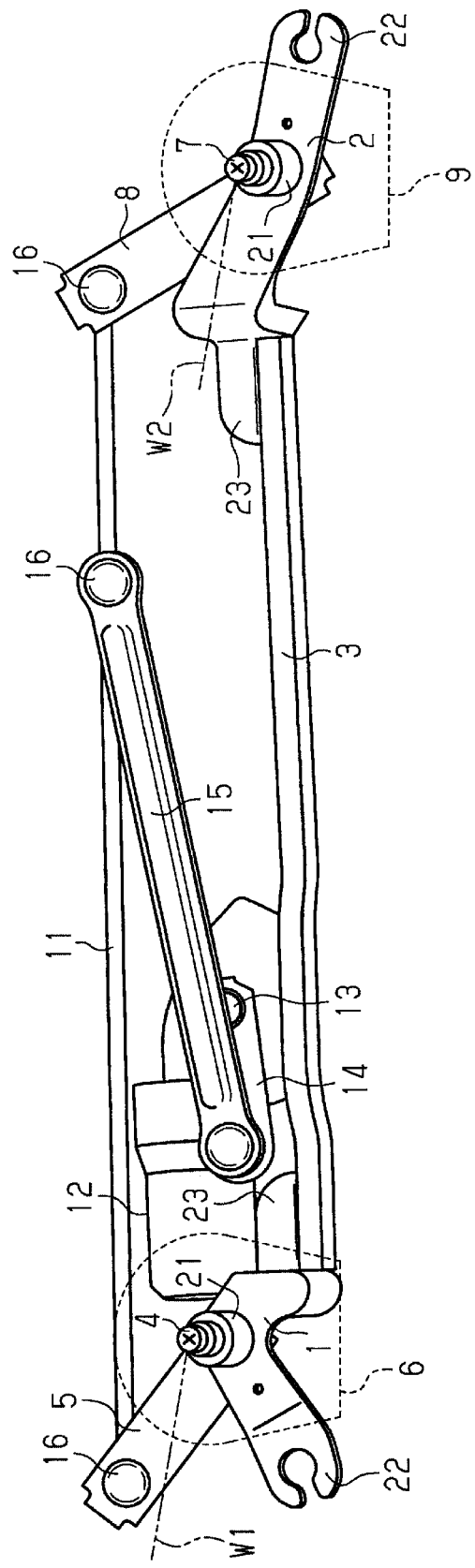
FIG. 1 is a schematic diagram of a wiper device according to one embodiment of the present invention.

As shown in FIG. 1, the wiper device includes a first pivot holder 1, a second pivot holder 2, and a coupling frame 3 that couples the first pivot holder 1 and the second pivot holder 2. The wiper device is fixed to the body of a vehicle below a windshield (not shown).

The wiper device further includes a first pivot shaft 4, a second pivot shaft 7, a first lever 5, and a second lever 8. The first pivot shaft 4 and the second pivot shaft 7 are supported in a rotatable manner by the first pivot holder 1 and the second pivot holder 2, respectively. The first lever 5 and the second lever 8 respectively include ends fixed to lower ends of the pivot shaft 4 and the pivot shaft 7, extend in radial directions (orthogonal to axial directions), and pivot integrally with the pivot shaft 4 and the pivot shaft 7. A first wiper W1 and a second wiper W2 are respectively fixed to upper ends of the first pivot shaft 4 and the second pivot shaft 7. Further, a first water receiving cap 6 and a second water receiving cap 9 are respectively attached to the first pivot holder 1 and the second pivot holder 2.

The wiper device further includes a coupling rod 11. The coupling rod 11 includes one end coupled to the other end of the first lever 5 and another end coupled to the other end of the second lever 8. The wiper device further includes a motor 12 and a crank arm 14. The motor 12 is fixed to the coupling frame 3. The crank arm 14 extends from an output shaft 13 of the motor 12 in a radial direction (orthogonal to axial direction) and integrally rotates with the output shaft 13. The wiper device further includes a drive rod 15. The drive rod 15 includes one end coupled to a distal end of the crank arm 14 and another end coupled to an intermediate part of the coupling rod 11. In this case, a set of the first lever 5 and the coupling rod 11, a set of the second lever 8 and the coupling rod 11, and a set of the drive rod 15 and the coupling rod 11 are each coupled by a ball joint 16 in a relatively rotatable manner at the same side (distal side of pivot shaft 4 and pivot shaft 7) of the coupling rod 11.

In the wiper device, the driving force of the motor 12 is transmitted via the crank arm 14, the drive rod 15, the coupling rod 11, the first lever 5, and the second lever 8 to the first wiper W1 and the second wiper W2 to pivot the first wiper W1 and the second wiper W2. Consequently, the first wiper W1 and the second wiper W2 wipe the windshield of the vehicle.

The first pivot holder 1 and the first water receiving cap 6 will now be described in detail. The first pivot holder 1 and the first water receiving cap 6 respectively have the same structure as the second pivot holder 2 and the second water receiving cap 9. Thus, the second pivot holder 2 and the second water receiving cap 9 will not be described.

Figure 2:
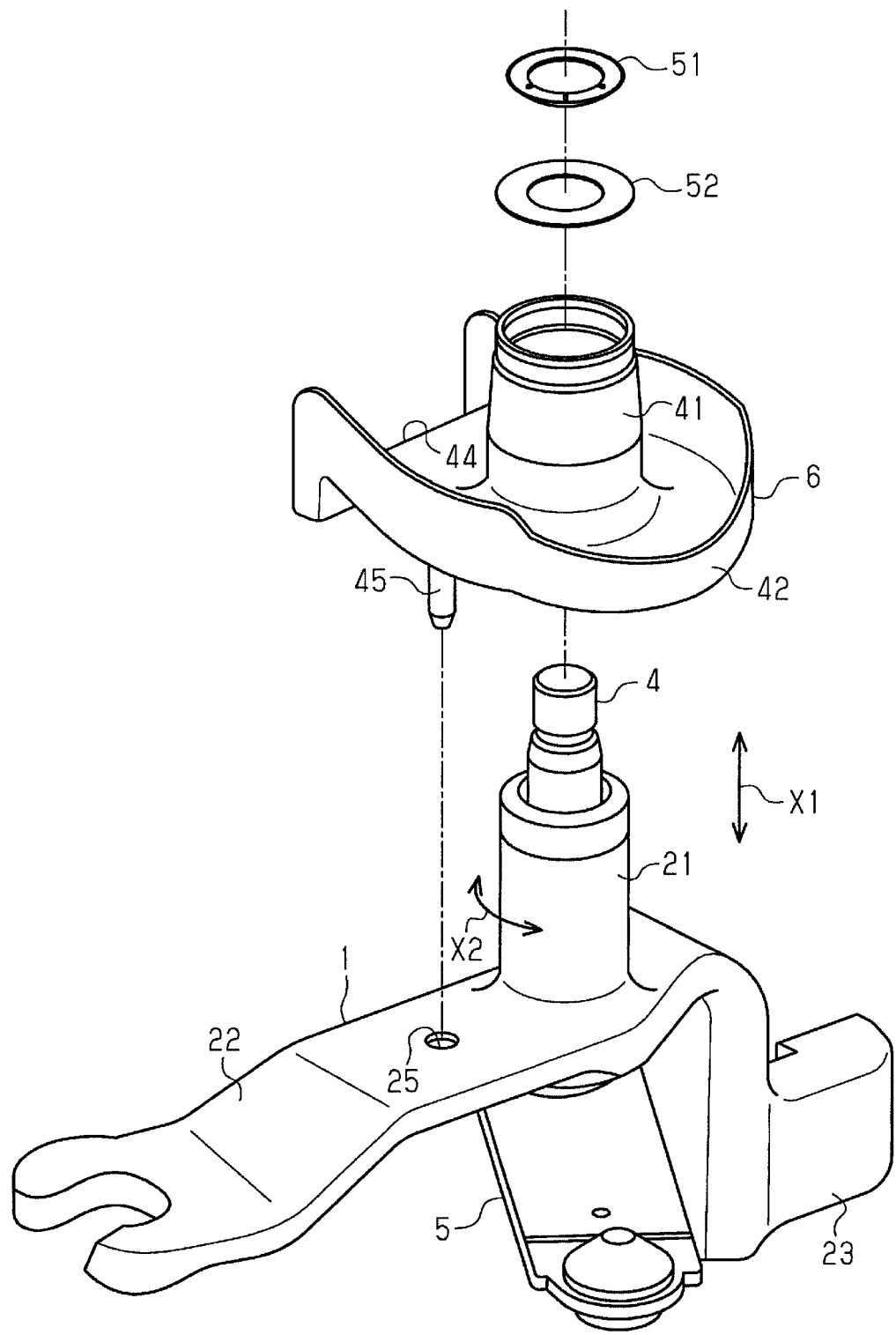
FIG. 2 is an exploded perspective view of a portion around a first pivot shaft in the wiper device of FIG. 1.

As shown in FIG. 2, the first pivot holder 1 of the present embodiment is formed from a metal by, for example, die-casting aluminum. The first pivot holder 1 includes a pivot support portion 21, a mounting leg 22, and a frame fixing portion 23. The pivot support portion 21 is tubular and pivotally supports the first pivot shaft 4, which is inserted into the first pivot holder 1. The mounting leg 22 projects radially outward from the outer circumferential surface of the pivot support portion 21. The frame fixing portion 23 is fixed to the coupling frame 3.

As shown in FIGS. 2 and 3, the pivot support portion 21 of the present embodiment is tubular and extends in an axial direction of the first pivot shaft 4 (hereafter, referred to as the axial direction X1). The pivot support portion 21 has an inner circumferential surface that holds two bearings 31 and 32. The pivot support portion 21 pivotally supports the first pivot shaft 4 with the bearings 31 and 32. Further, the pivot shaft 4, which is inserted into the pivot support portion 21, includes a distal end (upper end as viewed in FIG. 3) that projects outward from a distal end (upper end as viewed in FIG. 3) of the pivot support portion 21. An O-ring 33 fitted onto the first pivot shaft 4 is located at a radial inner side of the distal end of the pivot support portion 21 and closer than the distal end from the bearing 31. Further, the first pivot shaft 4 includes a lower end (lower end as viewed in FIG. 3) that projects outward from a lower end of the pivot support portion 21. The portion of the first pivot shaft 4, which projects from the lower end of the pivot support portion 21, is fixed to the first lever 5 so as to be integrally pivotal with the first lever 5.

The mounting leg 22 extends radially outward from a basal end of the pivot support portion 21 and has the form of a substantially belt-like plate. Further, the mounting leg 22 extends in a direction that differs from the direction extending toward the coupling frame 3 and the motor 12 (refer to FIG. 1). The mounting leg 22 includes a through part 25 that extends through the mounting leg 22 in an axial direction X1 at a position located toward a basal end of the mounting leg 22. In the present embodiment, the through part 25 is a round through hole located in a middle part of the mounting leg 22, more specifically, at a position located in the middle part of the mounting leg 22 in a circumferential direction of the first pivot shaft 4. Here, "the circumferential direction of the first pivot shaft 4" is the same as the pivoting direction of the first pivot shaft 4, and hereafter, will be referred to as the circumferential direction X2. The mounting leg 22 includes a distal end that is fixed to the vehicle body by a vibration insulator (not shown).

As shown in FIGS. 1 and 2, the frame fixing portion 23 extends radially outward from the basal end of the pivot support portion 21 in a direction that differs from the direction in which the mounting leg 22 extends. Further, the frame fixing portion 23 is fixed to one end of the coupling frame 3.

As shown in FIGS. 2 and 3, the first water receiving cap 6 is made of a resin and includes a boss portion 41 and an umbrella portion 42. The boss portion 41 has the form of a tube and is fitted onto the pivot support portion 21. The umbrella portion 42 extends radially outward from the boss portion 41.

The boss portion 41 is cylindrical and has an inner diameter that is larger than an outer diameter of the pivot support portion 21. Further, the boss portion 41 has an axial length that is slightly shorter than or equal to that of the pivot support portion 21. The boss portion 41 includes a lower end surface arranged in contact with the mounting leg 22 in the axial direction X1.

The umbrella portion 42 extends radially outward from the entire circumference of a basal end of the boss portion 41 in the radial direction. The umbrella portion 42 has the form of a ring-shaped flange surrounding the boss portion 41 and includes a circumferential part projecting toward a distal side (upper side as viewed in FIG. 3) of the boss portion 41. Further, part of the circumferential part of the umbrella portion 42 includes a drain 44 that drains water from the umbrella portion 42. The drain 44 extends along a descending slope to guide water out of the umbrella portion 42 to a location separated from the motor 12 and the ball joints 16 (refer to FIG. 1).

The part of the umbrella portion 42 that opposes the mounting leg 22 in the axial direction X1 includes an insertion projection 45 that projects in the axial direction X1 for insertion into the through part 25. The insertion projection 45, which has a length in the projection direction that is greater than the thickness of the mounting leg 22, is inserted through the through part 25 (mounting leg 22). Further, the insertion projection 45 opposes (engages) the through part 25 in the circumferential direction X2 without engaging the mounting leg 22 (through part 25) in the axial direction X1 (without being caught in the axial direction X1). The insertion projection 45 is tapered from the umbrella portion 42 toward a distal end of the insertion projection 45.

A first washer 51 is fixed to the outer circumferential surface of the first pivot shaft 4, which projects from the distal end of the pivot support portion 21. Further, a second washer 52, which is a ring-shaped plate, is arranged between the first washer 51 and a distal end surface of the pivot support portion 21 in a state in which the second washer 52 is fitted to the first pivot shaft 4.

The second washer 52 has an inner diameter that is slightly larger than an outer diameter of the first pivot shaft 4. Further, the second washer 52 has an outer diameter that is larger than the outer diameter of the pivot support portion 21. In the present embodiment, the outer diameter of the second washer 52 is substantially equal to an outer diameter of the boss portion 41. Accordingly, the second washer 52 opposes a distal end surface of the boss portion 41 in the axial direction X1. Thus, the boss portion 41 overlaps the second washer 52 in the axial direction X1. The second washer 52 is rotatable relative to the first pivot shaft 4.

The first washer 51 of the present embodiment is a ring-shaped toothed washer. The first washer 51 is fitted (fastened) onto the circumference of the first pivot shaft 4 from the distal side of the first pivot shaft 4 so that the second washer 52 is located between the distal end surface of the pivot support portion 21 and the first washer 51. Further, the first washer 51 is fixed to the first pivot shaft 4 so as to be rotatable integrally with the first pivot shaft 4 and immovable toward the distal side of the first pivot shaft 4. The first washer 51 and the distal end surface of the pivot support portion 21 hold the second washer 52 in between, and the first washer 51 restricts movement of the second washer 52 toward the distal side of the first pivot shaft 4. Further, the second washer 52 is arranged immovably in the axial direction X1 by the first washer 51 and the pivot support portion 21. More specifically, the second washer 52 is fixed to the circumference of the first pivot shaft 4 by the first washer 51 and the pivot support portion 21 so as to be inseparable from the first pivot shaft 4.

As shown in FIG. 3, a basal end of a wiper arm 61 of the first wiper W1 is fixed by a nut 62 to the distal end of the first pivot shaft 4 (part of first pivot shaft 4 closer to distal end than first washer 51). The basal end of the wiper arm 61 includes a tubular side wall 61a that extends toward the basal side of the first pivot shaft 4 surrounding the first pivot shaft 4. Further, the side wall 61a overlaps the outer circumference of the boss portion 41 at the distal end of the boss portion 41 in a radial direction of the first pivot shaft 4 (hereafter, referred to as the radial direction X3). That is, the distal end of the pivot support portion 21 and the distal end of the boss portion 41 are covered by the basal end of the wiper arm 61.

The operation of the present embodiment will now be described.

The second washer 52 is fixed to the circumference of the first pivot shaft 4 by the first washer 51 and the pivot support portion 21. The boss portion 41 of the first water receiving cap 6 overlaps the second washer 52 in the axial direction X1. In this manner, the second washer 52 prevents the first water receiving cap 6 from being separated from the distal side of the pivot support portion 21. The insertion projection 45 arranged on the umbrella portion 42 of the first water receiving cap 6 is inserted into the through part 25 of the mounting leg 22 to engage the through part 25 in the circumferential direction X2. Accordingly, the insertion of the insertion projection 45 into the through part 25 prevents rotation of the first water receiving cap 6 relative to the first pivot holder 1 in the circumferential direction X2. Here, L represents the movement distance of the first water receiving cap 6 from a state in which a lower end of the boss portion 41 is in contact with the mounting leg 22 until a distal end of the boss portion 41 contacts the second washer 52. That is, the distance L represents the distance between the distal end of the boss portion 41 and the second washer 52 when the lower end of the boss portion 41 is in contact with the mounting leg 22. Further, H represents the projection height of the insertion projection 45 from the umbrella portion 42, and D represents the dimension between the umbrella portion 42 and the mounting leg 22 when the water receiving cap 6 is coupled to the first pivot holder 1. In the present embodiment, the distance from the insertion projection 45 to the through part 25 is set to be greater than the travel distance L. More specifically, the projection height H of the insertion projection 45 is set to be greater than the sum of the dimension D between the umbrella portion 42 and the mounting leg 22 and the distance L between the distal end of the boss portion 41 and the second washer 52 (H>D+L). That is, the projection height H is set so that even when the first water receiving cap 6 is moved over the movement distance L, the insertion projection 45 would remain in the through part 25. This further ensures that rotation of the first water receiving cap 6 is restricted relative to the first pivot holder 1 in the circumferential direction X2.

When coupling the first water receiving cap 6 of the wiper device, the boss portion 41 is fitted onto the pivot support portion 21, and the insertion projection 45 is inserted into the through part 25 in the axial direction X1. The insertion projection 45 is inserted into the through part 25 without engaging the mounting leg 22 in the axial direction X1 (without being caught in the axial direction X1). Further, the first washer 51 and the second washer 52 are fixed to the circumference of the first pivot shaft 4, which is supported by the pivot support portion 21. This prevents separation of the first water receiving cap 6 from the first pivot holder 1. In this manner, the first water receiving cap 6 is coupled in a state in which the rotation relative to the first pivot holder 1 in the circumferential direction X2 is restricted. Thus, the structure that prevents separation of the first water receiving cap 6 from the first pivot holder 1 in the axial direction and the structure that prevents rotation of the first water receiving cap 6 relative to the first pivot holder 1 in the circumferential direction X2 avoid damage when assembling the wiper device.

The second pivot holder 2, which pivotally supports the second pivot holder 2, and the second water receiving cap 9, which is attached to the second pivot holder 2, operate in the same manner.

The advantages of the present embodiment will now be described.

(1) The present embodiment restricts separation of the first water receiving cap 6 from the first pivot holder 1 and separation of the second water receiving cap 9 from the second pivot holder 2. Additionally, the present embodiment effectively prevents rotation of the first water receiving cap 6 relative to the first pivot holder 1 in the circumferential direction X2 as well as rotation of the second water receiving cap 9 relative to the second pivot holder 2 in a circumferential direction of the second pivot shaft 7. This restricts separation of the first water receiving cap 6 from the first pivot holder 1 when in a correctly coupled state and separation of the second water receiving cap 9 from the second pivot holder 2 when in a correctly coupled state.

(2) Even when the first pivot holder 1 is made of a metal and the first water receiving cap 6, which is attached to the first pivot holder 1, is made of a resin, the structure preventing separation of the first water receiving cap 6 from the first pivot holder 1 restricts damage that may be inflicted when assembling the wiper device. Accordingly, the wiper device including the first pivot holder 1, which is made of a metal, and the first water receiving cap 6, which is made of a resin, ensures that separation of the first water receiving cap 6 from the first pivot holder 1 is prevented in a correctly coupled state. The same applies to the second pivot holder 2 and the second water receiving cap 9.

(3) The second washer 52 is arranged immovably by the first washer 51 and the pivot support portion 21 in the axial direction X1 of the first pivot shaft 4. The boss portion 41 of the first water receiving cap 6 opposes the second washer 52 in the axial direction X1. Thus, the second washer 52 prevents the first water receiving cap 6 from being separated from the distal side of the pivot support portion 21. In the wiper device of the present embodiment, the second washer 52, which is fixed to the circumference of the first pivot shaft 4, ensures that separation of the first water receiving cap 6 is prevented from the first pivot holder 1. The second pivot shaft 7 has the same advantage.

(4) The insertion projection 45 is tapered from the umbrella portion 42 toward the distal end of the insertion projection 45. Accordingly, even if the insertion projection 45 is slightly misaligned with the through part 25 of the mounting leg 22 in the circumferential direction X2 when coupling the water receiving cap 6 to the pivot holder 1 in the axial direction, deeper insertion of the insertion projection 45 into the through part 25 will correct the misalignment and set the mounting leg 22 and the water receiving cap 6 in a predetermined opposing state. The second pivot shaft 7 has the same advantage.

The above embodiment may be modified as described below.

In the above embodiment, the toothed first washer 51 is fastened on the circumference of the first pivot shaft 4. The second washer 52, which is attached to (fitted onto) the first pivot shaft 4, is arranged immovably by the first washer 51 and the pivot support portion 21 in the axial direction X1. The number of washers coupled to the circumference of the first pivot shaft 4, which projects from the distal end of the pivot support portion 21, does not necessarily have to be two and may be one, three, or greater. For example, the second washer 52 may be omitted, and the structure may be such that only the toothed first washer 51 is fixed to the circumference of the first pivot shaft 4. In this case, the first washer 51 overlaps at least part of the boss portion 41 in the axial direction X1. Such a structure will also have advantages (1) and (2) of the above embodiment. The washer coupled to the circumference of the second pivot shaft 7, which projects from a distal end of the pivot support portion 21 of the second pivot holder 2, may also be modified in the same manner.

The shape of the second washer 52 is not limited to that of the above embodiment. For example, a second washer 72 shown in FIG. 4 is tubular and extends in the axial direction X1 to a position overlapping the outer circumference of the boss portion 41 in the radial direction X3. Thus, the distal end of the boss portion 41 is accommodated in the second washer 72. In such a case, the second washer 72 restricts the entrance of liquid such as water into the boss portion 41.

Figure 5:
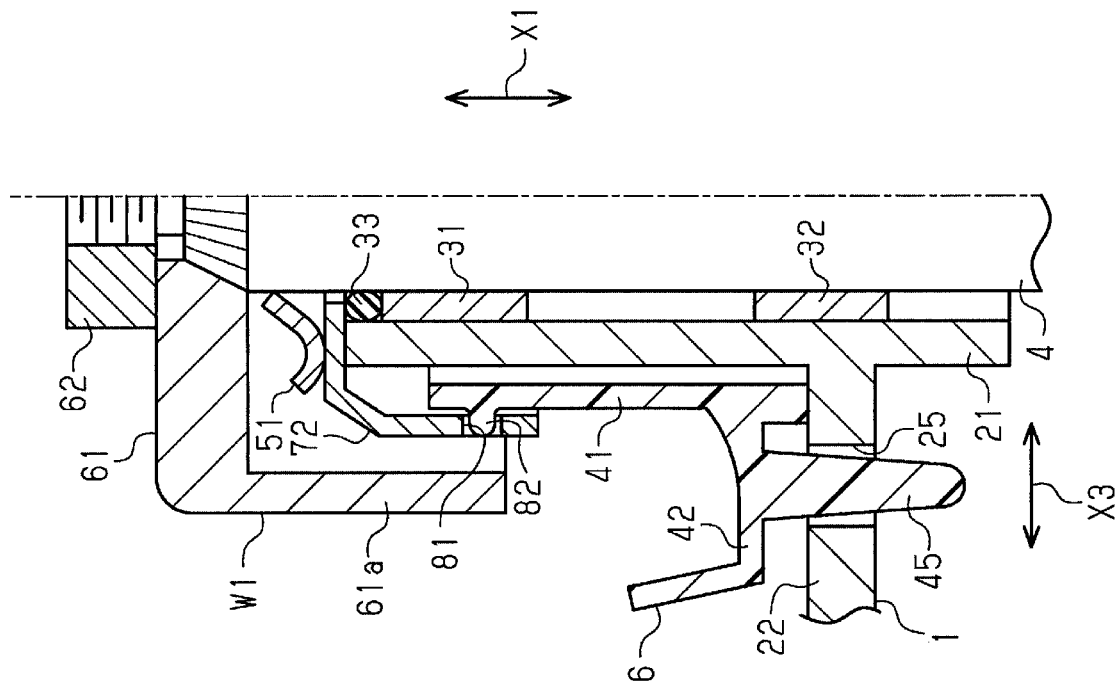
FIG. 5 is a cross-sectional view of the portion around the first pivot shaft in a wiper device according to a further embodiment.

As shown in FIG. 5, the part of the second washer 72 overlapping the boss portion 41 in the radial direction X3 may include a first engagement part 81. In this case, the boss portion 41 includes a second engagement part 82 that engages the first engagement part 81 in the axial direction X1. In FIG. 5, the first engagement part 81 is a through hole extending through the second washer 72 in the radial direction, and the second engagement part 82 is a projection projecting radially outward from the outer circumferential surface of the boss portion 41 and is inserted into the first engagement part 81. Further, the first engagement part 81 and the second engagement part 82 are in engagement with each other as a projection and a recess. The first engagement part 81 may be a projection projecting radially inward from the second washer 72, and the second engagement part 82 may be a recess arranged in the outer circumferential surface of the boss portion 41 or a through hole extending through the boss portion 41 in the radial direction. In this case, the engagement of the first engagement part 81 with the second engagement part 82 in the axial direction X1 restricts movement of the first water receiving cap 6 relative to the second washer 72 in the axial direction X1. Consequently, movement of the first water receiving cap 6 relative to the first pivot holder 1 in the axial direction X1 is restricted. This reduces vibration of the first water receiving cap 6 in the axial direction X1 and noise that may be produced by the movement of the first water receiving cap 6 in the axial direction X1.

Figure 6:
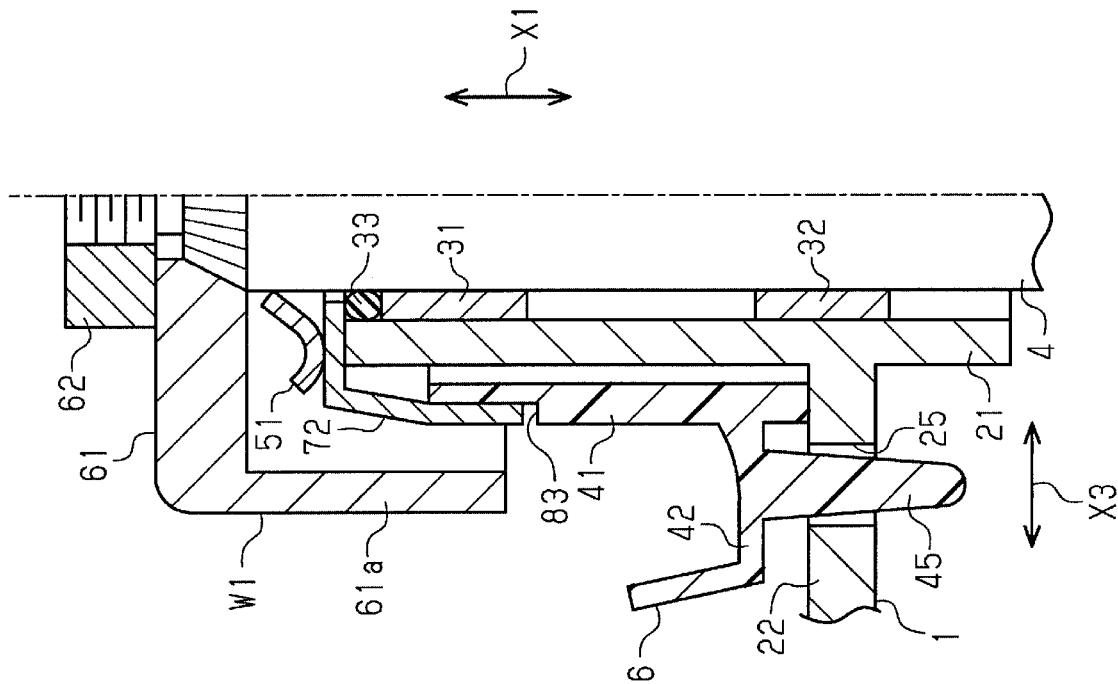
FIG. 6 is a cross-sectional view of the portion around the first pivot shaft in a wiper device according to a further embodiment.

As shown in FIG. 6, the distal end of the boss portion 41 and the second washer 72 may be fitted together. In FIG. 6, the distal end of the boss portion 41 includes a stepped recess 83 that is formed by reducing the outer diameter of the boss portion 41. The part of the second washer 72 overlapping the boss portion 41 in the radial direction X3 is fitted to the descended platform 83 of the boss portion 41. More specifically, a distal end of the second washer 72 (lower end of second washer 72 opposing basal side of first pivot shaft 4) and the distal end of the boss portion 41 are fitted together. In this manner, the labyrinthine structure formed between the distal end of the second washer 72 and the distal end of boss portion 41 restricts the entrance of liquid such as water into the boss portion 41. The distal end of the boss portion 41 may be constructed to be fitted onto the distal end of the second washer 72.

The second washer 52 and the second water receiving cap 9 that are fixed to the circumference of the second pivot shaft 7 may be modified in the same manner as the examples of FIGS. 4 to 6. Further, the first washer 51 may be constructed in the same manner as the second washer 72 of FIGS. 4 to 6.

In the above embodiment, the first pivot holder 1 and the second pivot holder 2 are made of a metal, and the first water receiving cap 6 and the second water receiving cap 9 are made of a resin. However, the material forming the first and second pivot holders 1 and 2 and the material forming the first and second water receiving caps 6 and 9 are not limited in such a manner. For example, the first and second water receiving caps 6 and 9 may be made of a metal or a rubber.

Instead of the insertion projection 45 of the above embodiment, as shown in FIGS. 7 and 8, the umbrella portion 42 of the first water receiving cap 6 may include two engagement projections 91. The two engagement projections 91 project from the umbrella portion 42 in the axial direction X1 toward regions located at opposite sides of the mounting leg 22 in the circumferential direction X2. Further, the two engagement projections 91 oppose the mounting leg 22 in the circumferential direction X2 at the regions located at opposite sides of the mounting leg 22 in the circumferential direction X2. More specifically, the mounting leg 22 is arranged between the two engagement projections 91 and engages the two engagement projections 91 in the circumferential direction X2 but not in the axial direction X1.

In this case, the engagement projections 91 restrict rotation of the first water receiving cap 6 relative to the first pivot holder 1 in the circumferential direction X2. Further, when assembling the wiper device, the boss portion 41 is fitted onto the pivot support portion 21, and the engagement projections 91 are arranged in the axial direction X1 at the regions located at opposite sides of the mounting leg 22 in the circumferential direction X2. In this case, each engagement projection 91 does not engage the mounting leg 22 in the axial direction X1. Then, the first washer 51 and the second washer 52 are fixed to the circumference of the first pivot shaft 4 supported by the pivot support portion 21. Thus, the first water receiving cap 6 is coupled in a state in which separation from the first pivot holder 1 and rotation relative to the first pivot holder 1 in the circumferential direction X2 are restricted. Accordingly, damage that may be inflicted when assembling the wiper device is avoided by the structure that prevents separation of the first water receiving cap 6 from the first pivot holder 1 in the axial direction and the structure that restricts rotation of the first water receiving cap 6 relative to the first pivot holder 1 in the circumferential direction X2. Consequently, the wiper device further ensures that separation of the first water receiving cap 6 from the first pivot holder 1 is restricted. In the present example, in the same manner as the above embodiment, the projection height H of the engagement projection 91 is set to be greater than the sum of the dimension D between the umbrella portion 42 and the mounting leg 22 and the distance L between the distal end of the boss portion 41 and the second washer 52. In other words, the projection height H of the engagement projection 91 is set so that even when the first water receiving cap 6 is moved over the movement distance L, the engagement projection 91 and the mounting leg 22 remain engaged in the circumferential direction X2. This further effectively prevents rotation of the first water receiving cap 6 relative to the first pivot holder 1 in the circumferential direction X2. Thus, prevention of separation of the first water receiving cap 6 from the first pivot holder 1 when in a correctly coupled state is further ensured.

The number of the engagement projections 91 arranged on the umbrella portion 42 does not necessarily have to be two as long as each engagement projection 91 is located at the regions located at opposite sides of the mounting leg 22 in the circumferential direction X2. The second water receiving cap 9 may also include the engagement projections 91 instead of the insertion projection 45 in the same manner.

In the same manner as the second washer 72 shown in FIG. 4, the second washer 52 in FIG. 7 may be tubular and extend in the axial direction X1 to a position overlapping the outer circumference of the boss portion 41 in the radial direction X3. This accommodates the distal end of the boss portion 41 inside the second washer 52.

In the above embodiment, the through part 25 is a round through hole extending through the mounting leg 22 in the axial direction X1. However, the shape of the through part 25 is not limited in such a manner. For example, the through part 25 may be a through hole that has the shape of an oval or a polygon when viewed in the axial direction X1. Further, the through part 25 does not necessarily have to be a through hole and may be a groove as long as the groove extends through the mounting leg 22 in the axial direction X1 and restricts movement of the insertion projection 45 relative to the mounting leg 22 in the circumferential direction X2 (movement in circumferential direction X2 in both one direction and the other direction). For example, the through part 25 may be a substantially L-shaped groove that extends from one end of the mounting leg 22 in the circumferential direction X2 toward the middle of the mounting leg 22 in the circumferential direction X2 and then in the radial direction X3. Further, as viewed in the axial direction X1, the through part 25 may be a groove, extending in a direction inclined relative to the radial direction X3 from one end of the mounting leg 22 in the circumferential direction X2.

In the above embodiment, the umbrella portion 42 of the first water receiving cap 6 includes a single insertion projection 45. Further, the mounting leg 22 includes a single through part 25, into which the insertion projection 45 is inserted. However, the number of the insertion projections 45 arranged on the umbrella portion 42 and the number of the through parts 25 arranged in the mounting leg 22 may be two or greater. The second pivot holder 2 and the second water receiving cap 9 may be modified in the same manner.

The first pivot holder 1 and the second pivot holder 2 do not have to be shaped as described in the above embodiment and may be modified in accordance with the layout area or layout position for mounting on the vehicle as long as the structure includes a tubular pivot support portion and a mounting leg projecting radially outward from the pivot support portion.

The first water receiving cap 6 does not have to be shaped as described in the above embodiment as long as the structure includes a tubular boss portion fitted onto the pivot support portion 21 and an umbrella portion extending radially outward from the boss portion. For example, the first water receiving cap 6 may include a tubular drain extending from the umbrella portion. The second water receiving cap 9 may be modified in the same manner.

The wiper device in the above embodiment drives two wipers, namely, the first wiper W1 and the second wiper W2, but may drive only one wiper.

The invention claimed is:

1. A wiper device comprising:
a pivot shaft to which a wiper is coupled;
a pivot holder that includes a tubular pivot support portion and a mounting leg, wherein the pivot support portion pivotally supports the pivot shaft that is inserted into the pivot support portion, and the mounting leg projects radially outward from an outer circumferential surface of the pivot support portion;
a water receiving cap that includes a tubular boss portion and an umbrella portion, wherein the boss portion is fitted onto the pivot support portion, and the umbrella portion extends radially outward from the boss portion;
at least one washer fixed to a circumference of the pivot shaft at a portion projecting from a distal end of the pivot support portion, wherein
at least part of the boss portion overlaps the washer in an axial direction of the pivot shaft,
the umbrella portion includes a projection that projects in the axial direction of the pivot shaft, and
the projection opposes the mounting leg in a circumferential direction of the pivot shaft without engaging the mounting leg in the axial direction of the pivot shaft in a state in which the water receiving cap is coupled to the pivot holder.

2. The wiper device according to claim 1, wherein the pivot holder is made of a metal, and
the water receiving cap is made of a resin.

3. The wiper device according to claim 1, wherein
the projection opposes the mounting leg in the circumferential direction of the pivot shaft when the water receiving cap is in contact with the at least one washer.

4. The wiper device according to claim 3, wherein
the projection projects from the umbrella portion toward a basal end of the pivot shaft, and
a projection height of the projection from the umbrella portion is set to be greater than a sum of a dimension between the umbrella portion and the mounting leg in a state in which the water receiving cap is coupled to the pivot holder and a distance between a distal end of the boss portion and the at least one washer when a lower end of the boss portion is in contact with the mounting leg.

5. The wiper device according to claim 1, wherein
the mounting leg includes a through part that extends through the mounting leg in the axial direction of the pivot shaft,
the projection is an insertion projection that projects in the axial direction of the pivot shaft and is inserted into the through part, and
the insertion projection opposes the through part in the circumferential direction of the pivot shaft without engaging the mounting leg in the axial direction of the pivot shaft in a state inserted into the through part.

6. The wiper device according to claim 1, wherein
the projection includes engagement projections that project in the axial direction of the pivot shaft at regions located at opposite sides of the mounting leg in the circumferential direction of the pivot shaft in a state in which the water receiving cap is coupled to the pivot holder, and
the engagement projections oppose the mounting leg in the circumferential direction of the pivot shaft at the regions located at opposite sides of the mounting leg without engaging the mounting leg in the axial direction of the pivot shaft.

7. The wiper device according to claim 1, wherein,
the washer, which opposes the boss portion in the axial direction of the pivot shaft, is tubular and extends in the axial direction to a position overlapping an outer circumference of the boss portion in the radial direction of the pivot shaft, and
the distal end of the boss portion is accommodated inside the washer.

8. The wiper device according to claim 1, wherein
the projection is tapered from the umbrella portion toward a distal end of the projection.

9. The wiper device according to claim 1, wherein
the washer is a first washer,
the first washer is a toothed washer that is fixed to an outer circumferential surface of the pivot shaft,
the wiper device further comprising a second washer,
the second washer is arranged between the first washer and a distal end surface of the pivot support portion by the first washer and the pivot support portion to be immovable in the axial direction of the pivot shaft, and
the second washer opposes a distal end surface of the boss portion in the axial direction.

* * * * *